| | US008090834B2 |

(12) United States Patent
Battagin et al.

(10) Patent No.: US 8,090,834 B2
(45) Date of Patent: *Jan. 3, 2012

(54) SYSTEM AND METHOD FOR OPTIMIZING SERVER RESOURCES WHILE PROVIDING INTERACTION WITH DOCUMENTS ACCESSIBLE THROUGH THE SERVER

(75) Inventors: Daniel Chapman Battagin, Bellevue, WA (US); Sanjay Govindrao Kulkarni, Sammamish, WA (US); Naveen Kumar, Redmond, WA (US); Shawn Michael Allen Lipstein, Seattle, WA (US); Yariv Ben-Tovim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/629,154

(22) Filed: Dec. 2, 2009

(65) Prior Publication Data

US 2010/0077081 A1    Mar. 25, 2010

Related U.S. Application Data

(63) Continuation of application No. 11/015,230, filed on Dec. 17, 2004, now Pat. No. 7,673,050.

(51) Int. Cl.
*G06F 15/173*   (2006.01)
*G06F 15/16*    (2006.01)

(52) U.S. Cl. ......... 709/226; 709/218; 709/219; 709/229

(58) Field of Classification Search .................. 709/217, 709/219, 226–229
See application file for complete search history.

(56) References Cited

U.S. PATENT DOCUMENTS

| 6,330,561 | B1 | 12/2001 | Cohen et al. ..................... 707/10 |
| 6,879,999 | B2 | 4/2005 | Elnozahy ....................... 709/219 |
| 6,978,298 | B1 | 12/2005 | Kuehr-McLaren ........... 709/223 |
| 7,171,443 | B2 | 1/2007 | Tiemann et al. ............... 709/203 |
| 7,673,050 | B2 | 3/2010 | Battagin et al. ............... 709/226 |
| 2002/0129123 | A1* | 9/2002 | Johnson et al. ............... 709/219 |
| 2002/0178253 | A1 | 11/2002 | Sedlack ........................ 709/224 |
| 2003/0023766 | A1 | 1/2003 | Elnozahy ....................... 709/310 |
| 2003/0145101 | A1* | 7/2003 | Mitchell et al. ............... 709/236 |
| 2004/0128346 | A1* | 7/2004 | Melamed et al. ............. 709/203 |
| 2005/0015765 | A1 | 1/2005 | Covell et al. .................. 718/100 |
| 2005/0177635 | A1* | 8/2005 | Schmidt et al. ............... 709/226 |

* cited by examiner

*Primary Examiner* — Asad M Nawaz
*Assistant Examiner* — Farzana Huq
(74) *Attorney, Agent, or Firm* — Merchant & Gould

(57) ABSTRACT

A system and method for optimizing server resources while providing interaction with documents accessible through the server. The system allows a user to open and interact with a document without opening a session. Aspects of the present disclosure relate to a computer-implemented method having steps for determining whether a document is static in response to a request to open the document, and opening the document in a sessionless mode when the document is static. Other aspects of the present disclosure relate to a computer-implemented method having steps for determining whether a trigger has occurred and transitioning to a session mode for the document when a trigger has occurred.

18 Claims, 4 Drawing Sheets

US 8,090,834 B2

SYSTEM AND METHOD FOR OPTIMIZING SERVER RESOURCES WHILE PROVIDING INTERACTION WITH DOCUMENTS ACCESSIBLE THROUGH THE SERVER

RELATED APPLICATION

This application is a continuation of application Ser. No. 11/015,230, filed Dec. 17, 2004. The benefit of the earlier filing date is hereby claimed under 35 U.S.C. §120.

BACKGROUND

With the advent and explosion of the Internet, computer users have grown accustomed to conveniently accessing virtually any kind of electronic document from virtually any location. In particular, the proliferation of the World Wide Web (the "Web") and Web browser application programs have made accessing many kinds of documents, such as text and graphics documents, very convenient. Through a Web browser application program, a user can access and view many types of electronic documents without the need for additional software.

When a user accesses a document on a server via the Internet, the server may instigate a session. A session may be defined as the amount of time a user interacts with an application. Stated another way, a session may begin when a user accesses a document and end when the user quits the document. When a session begins, resources are consumed on the server. Such resources may include storage, memory, power or any other resource used to maintain a session. Accordingly, as the number of sessions on a server increases, the available resources on the server decrease.

SUMMARY

The present disclosure relates to a system and method for optimizing server resources while providing interaction with documents accessible through the server. In general, the present disclosure allows a user to open and interact with a document without opening a session. Aspects of the present disclosure relate to a computer-implemented method having steps for determining whether a document is static in response to a request to open the document, and opening the document in a sessionless mode when the document is static.

The computer-implemented method of the present disclosure may also include steps for associating a mark with the document when the document is static and opening the document so that session resources are not allocated to the document. Steps may also include determining if a trigger occurs, transitioning to a session mode when a trigger has occurred, and allocating session resources to the document when in a session mode.

Another aspect of the present disclosure includes a computer-readable medium having computer-executable instructions. The instructions include identifying a static document, associating the static document with a sessionless mode, and transitioning from a sessionless mode to a session mode if a trigger has occurred.

Yet another aspect of the present disclosure includes a computer-readable medium having computer-executable components. The components include a document governor component that is arranged to identify whether a document is a static document, and is further arranged to open the file in a sessionless mode when the document is a static document. Components also include a server application component that is associated with the document governor and is arranged to allow user interaction with the document. Components further include a storage component associated with the document governor for storing documents, wherein the storage component includes at least the document.

DETAILED DESCRIPTION

Embodiments of the present disclosure now will be described more fully hereinafter with reference to the accompanying drawings, which form a part hereof, and which show, by way of illustration, specific exemplary embodiments for practicing the disclosure. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Embodiments of a Method and System for Optimizing Server Resources

Figure 3:
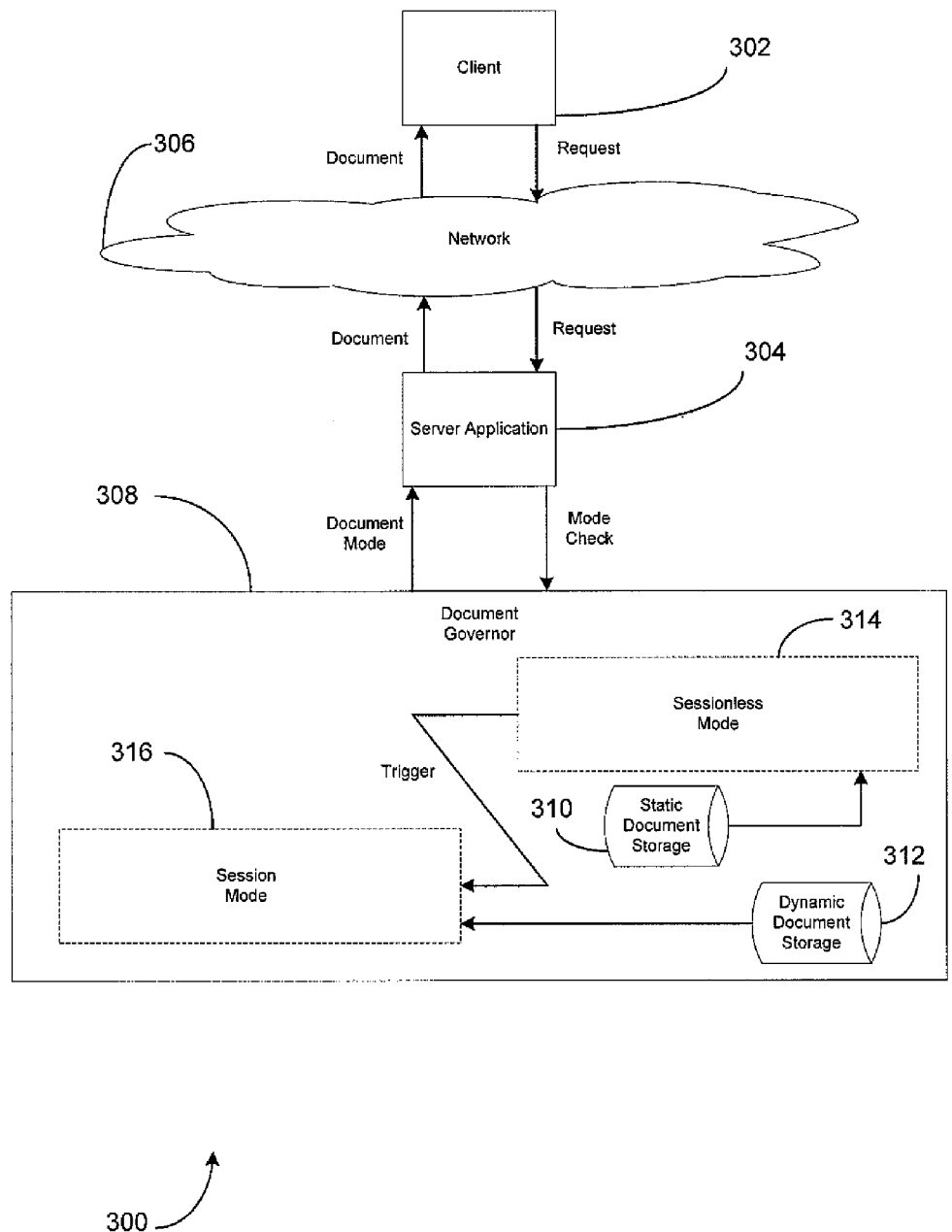
FIG. 3 illustrates an exemplary system for optimizing server resources while providing interaction with documents that may be used in one aspect of the present disclosure.

FIG. 3 represent one exemplary aspect of a system for optimizing server resources while providing interaction with documents accessible through the server. In general, in order for a user to access a document, copies of the document may be made and disseminated. For instance, in many scenarios the document is sent to other users via an electronic mail ("e-mail") message. The users that receive the document may then perform analysis on the document, manipulate the document, or add the document to another application. Alternatively, the document may be stored on a file share server where multiple users may access the contents of the document. In such a situation, the user may also perform analysis on the document, manipulate the document, or add the document to another application.

It is contemplated that a user may have access, via a server, to static documents and dynamic documents. A static document may include data that is always static or does not contain externally dependent data. For example, a static document may include a document that does not rely on, or is not "linked to", external data such as time, stock quotes, weather, market fluctuations or any other data external to the document that is volatile and requires updating in the document to remain current. In comparison, a dynamic document may include time dependent variables or rely on "links" to external data to remain current. For example, a dynamic document may include a spreadsheet document that automatically updates as the stock marked fluctuates. Such a document may include a formula that "links" the document to current market values and automatically refreshes the document.

Patent application Ser. No. 10/903,568, filed Jul. 30, 2004, titled "METHOD, SYSTEM AND APPARATUS FOR EXPOSING WORKBOOKS AS DATA SOURCES" is incorporated herein by reference to provide one type of detailed exemplary embodiment of a dynamic system that may incorporate a dynamic document. Patent application Ser. No. 10/858,175, filed Jun. 1, 2004, titled "METHOD, SYSTEM AND APPARATUS FOR EXPOSING WORKBOOK RANGES AS DATA SOURCES" is incorporated herein by reference to provide a detailed exemplary embodiment of another type dynamic system that may incorporate a dynamic document. Patent application Ser. No. 10/858,190, filed Jun. 1, 2004, titled "METHOD, SYSTEM, AND APPARATUS FOR DISCOVERING AND CONNECTING TO DATA SOURCES" is incorporated herein by reference to provide a detailed exemplary embodiment of yet another type of dynamic system that may incorporate a dynamic document. The above examples of static documents and dynamic documents are for exemplary purposes only, and other types of static and dynamic documents are contemplated from the disclosure herein. Such documents may include spreadsheet documents, word processing documents, ADOBE documents, Web-based documents, notes or any other document that may maintain a static or dynamic state.

As stated above, a user may have access to Web-based static or dynamic documents via a server. In some situations, when a user accesses a document, the server instigates a session. A session may be defined as an interval of interaction with an application. Stated another way, a session may begin when a user accesses a document and end when the user quits the document. When a session begins, resources are consumed on the server. Such resources may include storage, memory, power or any other resource used to maintain a session. As is more fully set forth herein, the present disclosure contemplates that there are many instances where a user may access a document on a server and interact with the document without starting a session and thereby conserve resources on the server. Such instances may include when a user only navigates or views a document.

With reference to FIG. 3, system 300 represents a general overview of a system for optimizing server resources while providing interaction with documents accessible through the server. System 300 includes client 302 having access to server application 304 through network 306. Client 302 may include any type of client having access to server 304. Client 302 may include a computing device such as computing device 100 described in conjunction with FIG. 1. Client 302 may also include a mobile computing device such as mobile computing device 200 described in conjunction with FIG. 2. Client 302 may include a single user, a group of users or a network of users.

Client 302 may include a number of program modules and data files stored on Client 302. Client 302 may have a Web browser application that is operative to request, receive, render, and provide interactivity with electronic documents, such as a Web page that has been formatted using HTML. According to one embodiment of the disclosure, the Web browser application comprises the INTERNET EXPLORER Web browser application program from MICROSOFT CORPORATION headquartered in Redmond, Wash. It should be appreciated, however, that other Web browser application programs from other manufactures may be utilized to embody various aspects of the present disclosure, such as the FIREFOX Web browser application from the MOZILLA FOUNDATION headquartered in Mountain View, Calif.

Server application 304 may include any type of server that is capable of access to document governor 308. In one embodiment, server application 304 includes a file share server. It should be appreciated that, according to another embodiment, server application 304 includes a WINDOWS SHAREPOINT SERVER from MICROSOFT CORPORATION. In yet another embodiment of the disclosure, server application 304 includes an EXCEL CALCULATION SERVER program from MICROSOFT CORPORATION. In still another embodiment, server application 304 may be operative to convert a document into HyperText Markup Language (HTML) so that a user may view the document.

Reference number 308 is a document governor. Document governor 308 may include several embodiments. In one embodiment, document governor 308 is an application or program associated with server application 304. In another embodiment, document governor 308 is a Web-based application. In yet another embodiment, document governor is a spreadsheet calculation server. In still another embodiment, document governor 308 includes an EXCEL CALCULATION SERVER program from MICROSOFT CORPORATION. Patent application Ser. No. 10/607,780, filed Jun. 27, 2003, titled "METHOD AND APPARATUS FOR VIEWING AND INTERACTING WITH A SPREADSHEET FROM WITHIN A BROWSER" is incorporated herein by reference to provide a detailed embodiment of one type of document governor 308.

Reference numbers 310 and 312 indicate a static document storage and a dynamic document storage, respectively. Even though storages 310 and 312 are depicted as separate storages, it is well within the scope of the present disclosure that storages 310 and 312 are a single storage. Also, storages 310 and 312 may be external or internal to document governor 308. In another embodiment, storages 310 and 312 include a memory associated with document governor 308.

In one aspect of the present disclosure, static documents are marked to indicate that the documents are static or in the alternative a dynamic document may be marked to indicate that the document is dynamic. As an example of a static document mark, when the document is initially saved, a user may have a save option that saves the document as a static document. In another embodiment, document governor 308 includes a save program that identifies whether or not a document contains dynamic material. If the document does not contain dynamic material, the document is saved as a static document. In still another embodiment, when the document is loaded, document governor 308 may identify dynamic functions in the document and then mark the document as static if no dynamic functions exist. Again, such dynamic functions may include external data queries, NOW functions, volatile functions or user defined functions. The mark that identifies a document as static may include any type of mark useful for indicating an attribute of a document. Such marks may include a flag, a header, a footer, metadata or other indicator.

Reference number 314 indicates a sessionless mode. As indicated by system 300, a static document (or marked document) may be opened in a sessionless mode. In a sessionless mode, resources that would be used to open a document in a session mode are freed for use by other components of system 300. Stated another way, the resources that would normally be allocated to the static document in a session mode are recycled so that they may be reallocated to thereby improve efficiency of system 300. In another embodiment, resources of document governor 308 remain associated with the document when the document is in a sessionless mode. System 300 may utilize the resources until a trigger occurs, as more fully defined below. The trigger reallocates the resources back to the static document and instigates a session for the document.

As stated, a static document may remain in a sessionless mode until a trigger occurs. A trigger is any event that takes place that requires resources to be reallocated back to the static document and puts the static document into session mode 316. In one exemplary embodiment, a non-trigger may include a navigation input. Such a navigation input may include scrolling the static document, paging, a find command, a GOTO command, changing document sheets, or moving around the document. In accordance with one aspect of the present disclosure, triggers may include, a filter command, sort command, a refresh command, a recalculation command, a get command or any other command that prompts a change of values within the document. It is further contemplated that the trigger may be a user defined trigger or a trigger may be a default so that a static document automatically enters session mode 316 upon opening. Any input that requires a session to be instigated may be a trigger and any input that does not require a session to be open may be a non-trigger.

Reference number 316 indicates a session mode. When a document is in session mode 316, the resources allocated to the document may not be accessible by other components of system 300. Stated another way, the resources may not be free when a session has occurred. In one embodiment, a document is reopened in a session mode once a trigger takes place. In another embodiment, the document is assigned a session identification once a session occurs. In yet another embodiment, dynamic documents are opened in a session mode despite the option to open in a sessionless mode. As is evident from system 300, resources are optimized on system 300 by providing and maintaining documents for client 302 with sessionless modes.

Set forth below, in light of FIG. 3, is one general example of optimizing server resources while providing interaction with a document. The example is merely for descriptive purposes and not meant to limit the breath of the present disclosure. Client 302 may request an Internet document via the Internet. The document request may comprise a client selecting a document associated with a server. The document request may identify the client making the request and the Uniform Resource Locator ("URL") of the requested document. Server application 304 may then check a document governor to determine if the requested document is static or dynamic. If the document is dynamic, the dynamic document is opened in session mode 316. In such a situation, resources are allocated to this session and other components of system 300 do not have access to these resources.

If the document is static, however, the document is opened in sessionless mode 314. While in a sessionless mode, resources that would be associated with a session are recycled (freed) so that system 300 may utilize these resources. Also, a client may view, navigate or otherwise traverse the document while in a sessionless mode without instigating a session. If client 302 inputs a trigger, the sessionless mode ends and the resources are reallocated to a session mode. Once in session mode 316, the resources allocated to the document are not accessible by other components to system 300. In accordance with aspects of the present disclosure, sessionless mode 314, session mode 316 and traversing between sessionless mode 314 and session mode 316, is seamless to client 302. Stated another way, the mode of the document or whether the document has moved between sessionless mode 314 and session mode 316 is transparent to client 302.

Figure 4:
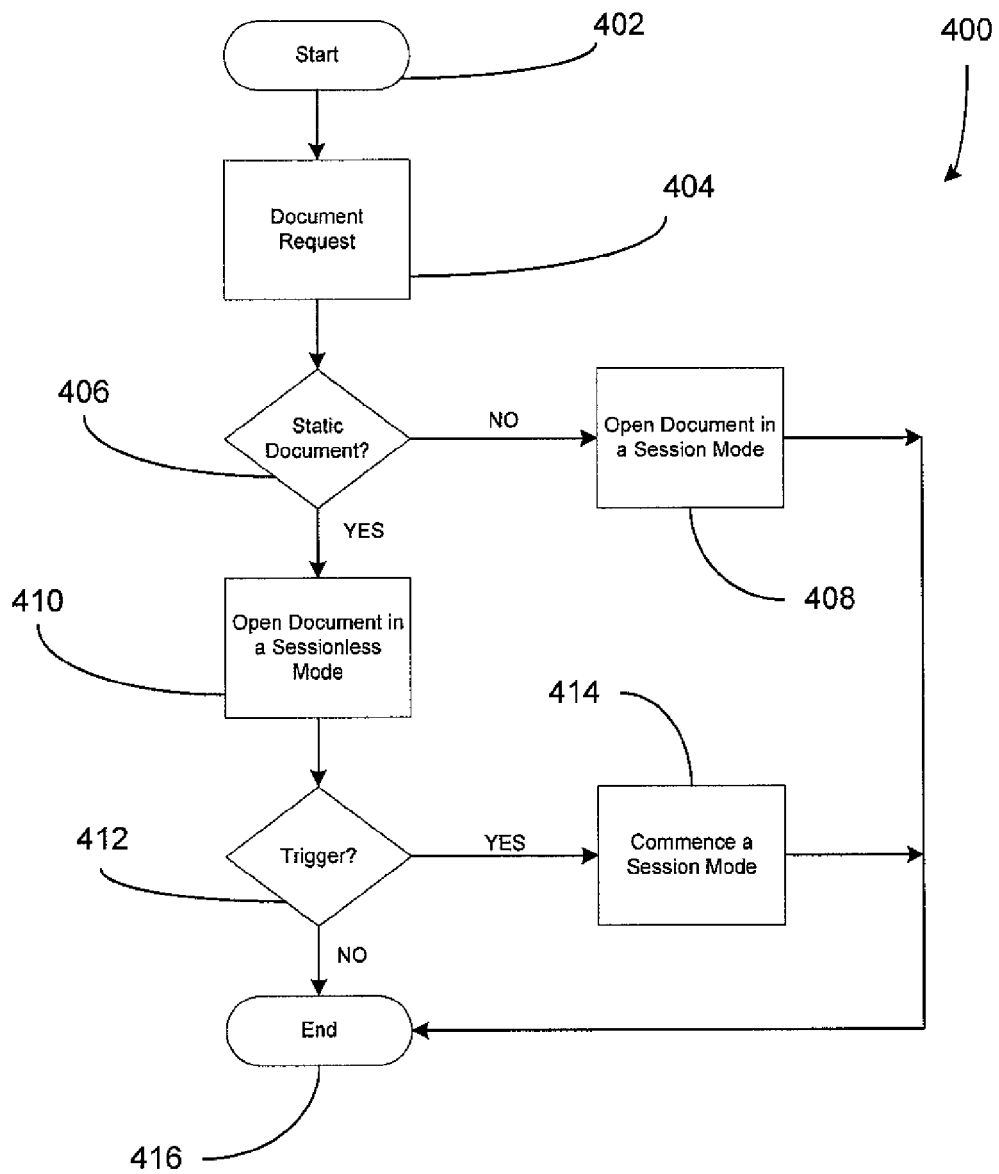
FIG. 4 illustrates a logical flow diagram of one aspect of the present disclosure.

FIG. 4 represents a logical flow diagram of one aspect of the present disclosure. The process starts at starting block 402 and continues to block 404 where a document request is sent to a server application. The document request may be sent from a client having access to the Internet, such as the request in conjunction with FIG. 3. However, in other aspects of the present disclosure the request is sent in a closed network. In one embodiment, the request includes the URL of the document and an identification of the client making the request.

At block 406, a determination is made whether the requested document is static. In one embodiment of the present disclosure, a mark is associated with a static document when the document is saved. In such a situation, a static document is identified by this mark. In another embodiment of the present disclosure, a static document is marked after a request occurs. When the document is loaded, the document governor may search the document for dynamic functions and then mark the document as static if no dynamic functions exist. If the document is dynamic, a session is opened as indicated by block 408 and the process ends at end block 416.

In the situation where the requested document is static, the process 400 flows to block 410 where the document is opened in a sessionless mode. In a sessionless mode, resources that would be used to open a document in a session mode are freed for use. The resources that are normally allocated to the static document in a session mode are recycled. These resources may then be reallocated to improve efficiency and optimize resource allocation.

The document remains in a sessionless mode while the client interacts with the document using non-triggers. In one embodiment, a non-trigger may include a navigation input or a view input. Such a navigation input may include scrolling the static document, paging, a find command, a GOTO command, changing document sheets, or moving around the document. A non-trigger may include any type of input that does not require resources to be allocated to the document and a session to occur.

At block 412, the process 400 determines if a client has entered a trigger. As stated above, triggers may include, a filter command, sort command, a refresh command, a recalculation command, a get command or any other command that prompts a change of values within the document. A trigger may also be a user-defined trigger or a trigger may be a default so that a static document automatically enters a session mode upon opening. Any input that requires a session to be instigated may be a trigger. If the user does enter a trigger, the process 400 flows to block 414 where a session is instigated. If the document was in a sessionless mode, the sessionless mode ceases and a session occurs. In such a situation, resources that were free during the sessionless mode are reallocated to the document in the session mode. In one embodiment of the present disclosure, a document is reopened in a session mode once a trigger takes place.

If a client does not enter a trigger the process 400 flows to end block 416 where the client quits the document. As is evident from the above, resource allocation is optimized while a document is in a sessionless mode because resources that are not necessary for a client to view and navigate a document may be freed for other uses. Also, resources are allocated, reallocated, freed or recycled seamlessly. Stated another way, a client's experience is not hindered or interrupted by the optimization of resources.

Illustrative Operating Environment

Figure 1:
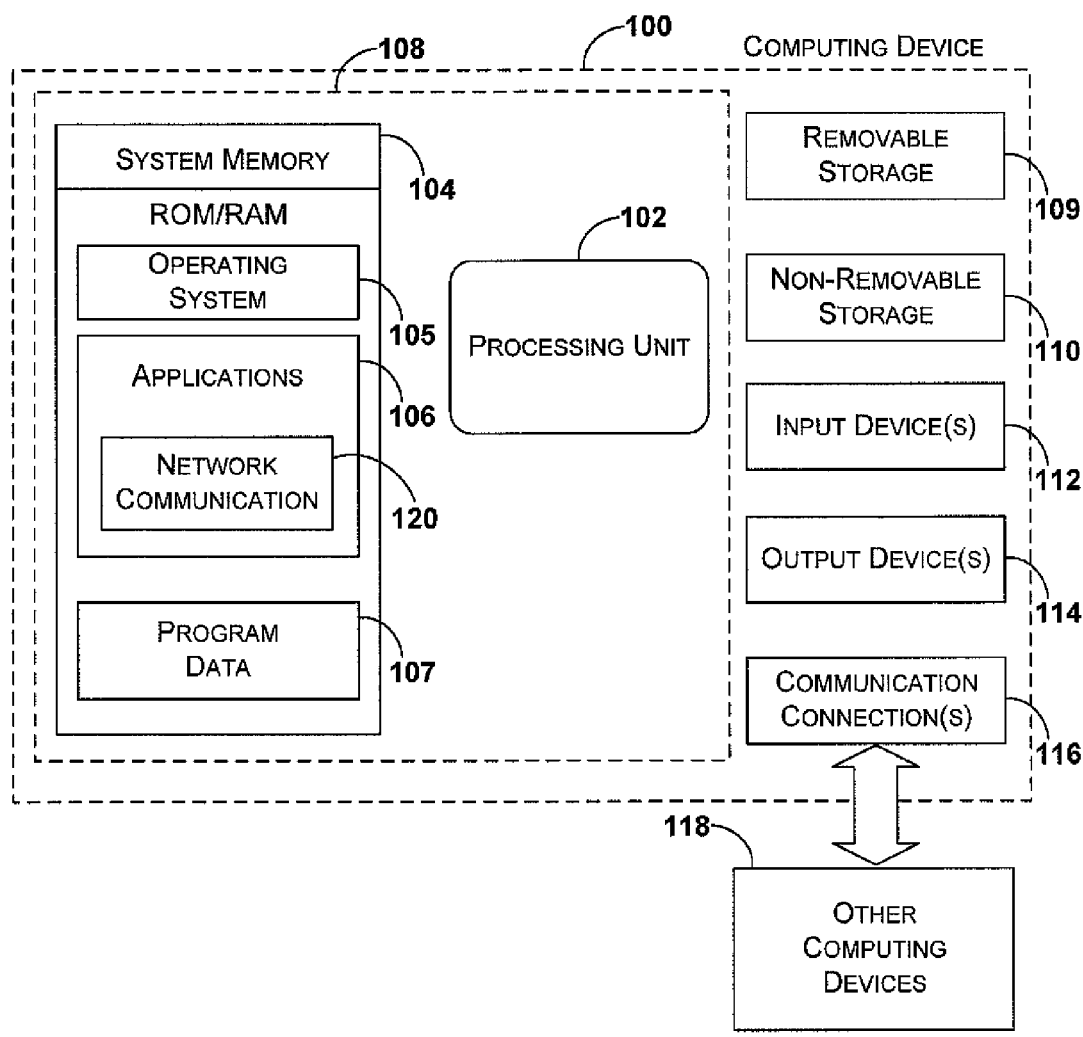
FIG. 1 illustrates an exemplary computing device that may be used in one aspect of the present disclosure.

Referring to FIG. 1, an exemplary system for implementing the disclosure includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. In one embodiment, applications 106 further include an application 120 for server optimization. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
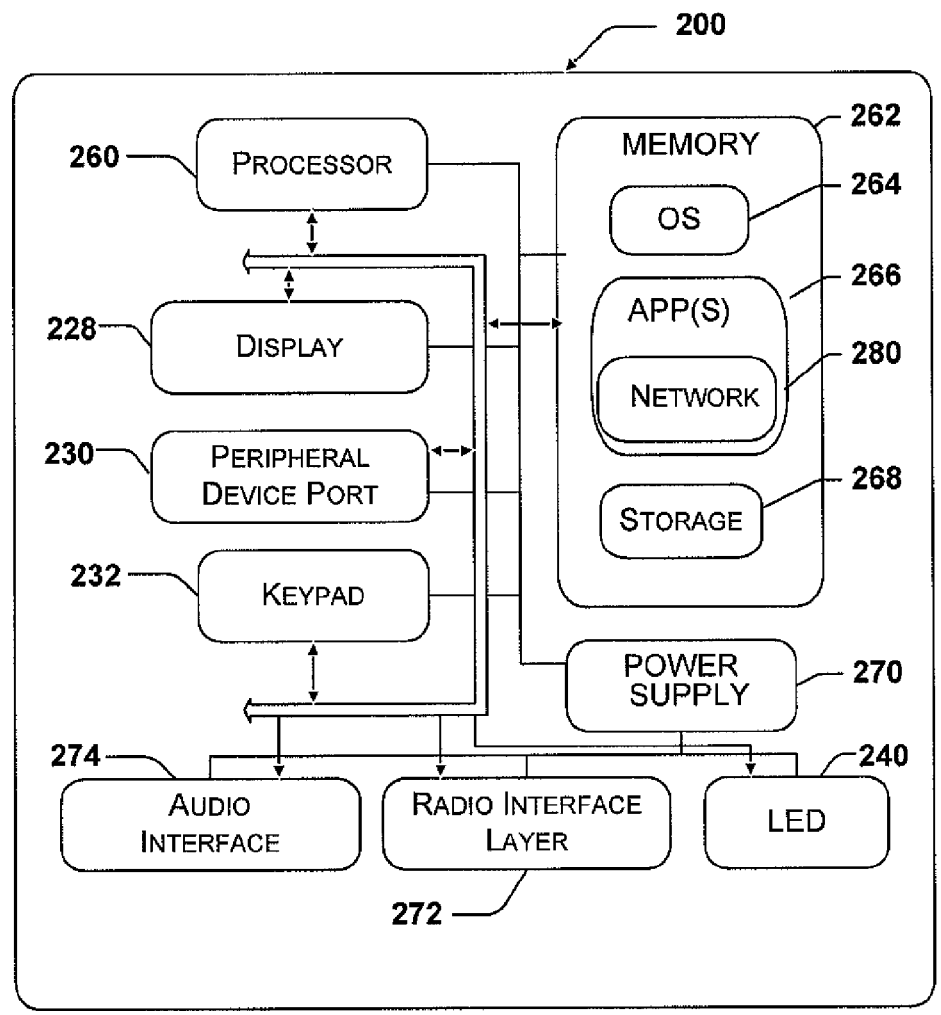
FIG. 2 illustrates an exemplary mobile device that may be used in one aspect of the present disclosure.

FIG. 2 illustrates a mobile computing device that may be used in one exemplary embodiment of the present disclosure. With reference to FIG. 2, one exemplary system for implementing the disclosure includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like. In one embodiment, applications 266 further include an application 280 for communicating with a network.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

The above specification, examples and data provide a complete description of the manufacture and use of the composition of the disclosure. Since many embodiments of the disclosure can be made without departing from the spirit and scope of the disclosure, the invention resides in the claims hereinafter appended.

What is claimed is:

1. A computer-readable storage medium, wherein the medium does not include signals, having computer-executable instructions stored on a memory for optimizing server resources through a sessionless mode, the instructions comprising:
providing a session mode on a document server, wherein the session mode is a mode for causing an interval of document accessibility where server session resources are allocated to the interval of document accessibility;
providing a sessionless mode on the document server, wherein the sessionless mode is a mode for causing an interval of document accessibility where server session

9 resources are allocated to other computing components associated with the document server;

receiving a request at the document server for a document located on the document server;

determining whether the requested document is at least one member of a group comprising: a static document that identifies a mark in the requested document that indicates static status and includes static data unlinked to external data, and a dynamic document that identifies a mark in the requested document that indicates dynamic status and includes dynamic data linked to external data;

when the document is a dynamic document, opening the dynamic document in the session mode of the document server; and when the document is a static document, opening the static document in the sessionless mode of the document server; and in response to receiving a change in value within the static document opened in the sessionless mode, initiating a session mode of the document server and reallocating server session resources for the interval of document accessibility.

2. The computer-readable storage medium of claim 1, wherein determining whether the requested document is a dynamic document includes at least one member of a group comprising: identifying a dynamic function in the requested document, and identifying dynamic data in the requested document linked to external data.

3. The computer-readable storage medium of claim 1, further comprising:

when the requested document is a static document and opened in the sessionless mode:
monitoring user inputs,
determining whether a user input causes a value change of a value within the opened document, and
maintaining the sessionless mode of the opened document when the user input does not cause a value change of a value within the opened document.

4. The computer-readable storage medium of claim 3, further comprising:

reallocating server session resources for the opened document to cause a session mode when the user input causes a value change of a value within the opened document.

5. The computer-readable storage medium of claim 3, wherein the user input that does not cause a value change of a value within the opened document is a navigation input.

6. The computer-readable storage medium of claim 5, wherein the navigation input is at least one member of a group comprising: a scrolling input, a paging input, a find command, and a GOTO command.

7. The computer-readable storage medium of claim 4, wherein the user input that causes a value change of a value within the opened document is at least one member of a group comprising: a filter command, a sort command, a refresh command, a recalculation command, and a get command.

8. A computer-implemented method for optimizing server resources through a sessionless mode, the method comprising:

causing a document server to open a document in a session mode, wherein the session mode is a mode for causing an interval of document accessibility where server session resources are allocated to the interval of document accessibility;

causing a document server to open a document in a sessionless mode, wherein the sessionless mode is a mode for causing an interval of document accessibility where

10 server session resources are allocated to other computing components associated with the document server;

receiving a request at the document server for a document located on the document server;

determining whether the requested document is at least one member of a group comprising: a static document that identifies a mark in the requested document that indicates static status and includes static data unlinked to external data, and a dynamic document that identifies a mark in the requested document that indicates dynamic status and includes dynamic data linked to external data;

when the document is a dynamic document, opening the dynamic document in the session mode of the document server; and when the document is a static document, opening the static document in the sessionless mode of the document server; and receiving an indication of a user input that causes a change of a value within the opened document; and in response to the indication of the user input, automatically causing a processor to reallocate server session resources for the opened document to cause a session mode while the document is open.

9. The computer-implemented method of claim 8, wherein the document is a static document.

10. The computer-implemented method of claim 9, wherein the static document includes data unlinked to any external data.

11. The computer-implemented method of claim 8, wherein the user input that causes a value change of a value within the opened document is at least one member of a group comprising: a filter command, a sort command, a refresh command, a recalculation command, and a get command.

12. A system for optimizing server resources through a sessionless mode, the system comprising:

a processor; and a memory having computer executable instructions stored thereon, wherein the computer-executable instructions are configured for:

providing a session mode on a document server, wherein the session mode is a mode for causing an interval of document accessibility where server session resources are allocated to the interval of document accessibility;

providing a sessionless mode on the document server, wherein the sessionless mode is a mode for causing an interval of document accessibility where server session resources are allocated to other computing components associated with the document server;

receiving a request on the document server for a document located on the document server;

determining whether the requested document is at least one member of a group comprising: a static document that identifies a mark in the requested document that indicates static status and includes static data unlinked to external data, and a dynamic document that identifies a mark in the requested document that indicates dynamic status and includes dynamic data linked to external data;

when the document is a dynamic document, opening the dynamic document in the session mode of the document server;

when the document is a static document, opening the static document in the sessionless mode of the document server; and in response to receiving a change in value within the static document opened in the sessionless mode, initiating a session mode of the document server and reallocating server session resources for the interval of document accessibility.

13. The system of claim 12, wherein when the document is a static document and opened in the sessionless mode, maintaining, on the document server, the sessionless mode of the document server, when a user input that does not prompt a change of a value within the document is received.

14. The system of claim 12, wherein determining whether the requested document is a dynamic document includes at least one member of a group comprising: identifying a dynamic function in the requested document, and identifying dynamic data in the requested document linked to external data.

15. The system of claim 13, wherein the user input that does not prompt a value change of a value within the static document is a navigation input.

16. The system of claim 15, wherein the navigation input is at least one member of a group comprising: a scrolling input, a paging input, a find command, and a GOTO command.

17. The system of claim 12, wherein the user input that prompts a value change of a value within the opened document is at least one member of a group comprising: a filter command, a sort command, a refresh command, a recalculation command, and a get command.

18. The system of claim 12, further comprising monitoring user inputs to determine when a user input prompts a change of a value within the document is received.

* * * * *